(12) United States Patent
Sakuma (10) Patent No.: US 12,014,631 B2
(45) Date of Patent: Jun. 18, 2024

(54) VEHICLE DISPLAY DEVICE, VEHICLE DISPLAY SYSTEM, VEHICLE DISPLAY METHOD, AND NON-TRANSITORY STORAGE MEDIUM STORING A PROGRAM

(71) Applicant: TOYOTA JIDOSHA KABUSHIKI KAISHA, Toyota (JP)

(72) Inventor: Yasushi Sakuma, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/809,756

(22) Filed: Jun. 29, 2022

(65) Prior Publication Data

US 2023/0022532 A1 Jan. 26, 2023

(30) Foreign Application Priority Data

Jul. 26, 2021 (JP) ................. 2021-122033

(51) Int. Cl.
  *G08G 1/0962* (2006.01)
  *B60K 35/00* (2024.01)
  *B60K 35/23* (2024.01)
  *B60K 35/28* (2024.01)

(52) U.S. Cl.
  CPC ........... *G08G 1/0962* (2013.01); *B60K 35/00* (2013.01); *B60K 35/23* (2024.01); *B60K 35/28* (2024.01); *B60K 2360/16* (2024.01)

(58) Field of Classification Search
  CPC .................. G08G 1/0962; B60K 35/00; B60K 2370/1529; B60K 2370/16
  See application file for complete search history.

(56) References Cited

U.S. PATENT DOCUMENTS

| | | | | |
|---|---|---|---|---|
| 5,703,780 A | * | 12/1997 | Takanabe | G01C 21/30 701/439 |
| 6,138,084 A | * | 10/2000 | Mine | G01C 21/26 702/158 |
| 6,208,927 B1 | * | 3/2001 | Mine | B60W 30/18145 701/72 |
| 2005/0240334 A1 | * | 10/2005 | Matsumoto | B60K 31/0083 701/96 |
| 2012/0245756 A1 | * | 9/2012 | Cooprider | B60W 50/14 701/1 |
| 2012/0245758 A1 | * | 9/2012 | Mizuta | B60W 30/182 701/1 |

(Continued)

FOREIGN PATENT DOCUMENTS

| JP | 2016016853 A | 2/2016 |
|---|---|---|
| JP | 6459205 B2 | 1/2019 |

(Continued)

*Primary Examiner* — Chico A Foxx
(74) *Attorney, Agent, or Firm* — Dickinson Wright, PLLC (57) ABSTRACT

A vehicle display device, includes: a curve information acquisition section configured to acquire information relating to a degree of curvature of a travel lane; a deceleration determination section configured to determine whether or not deceleration of a vehicle is required based on the degree of curvature of the travel lane and a vehicle speed; and a marking display section configured to, in a case in which deceleration is required, cause a display device to display a predetermined first marking superimposed along the travel lane at a display region inside a vehicle cabin.

8 Claims, 8 Drawing Sheets

(56) References Cited

U.S. PATENT DOCUMENTS

| | | | |
|---|---|---|---|
| 2012/0245817 A1* | 9/2012 | Cooprider | B60W 30/143 |
| | | | 701/1 |
| 2013/0238192 A1* | 9/2013 | Breu | B62D 15/029 |
| | | | 701/41 |
| 2014/0032072 A1* | 1/2014 | Yoshihama | B60W 30/12 |
| | | | 701/1 |
| 2014/0371988 A1* | 12/2014 | Muramatsu | B62D 15/0295 |
| | | | 701/41 |
| 2016/0153801 A1* | 6/2016 | Cho | G06T 11/60 |
| | | | 701/431 |
| 2016/0365068 A1* | 12/2016 | Sakaguchi | B60K 35/00 |
| 2017/0039438 A1 | 2/2017 | Homma | |
| 2017/0066450 A1 | 3/2017 | Ko | |
| 2017/0225619 A1* | 8/2017 | Torii | B60R 21/00 |
| 2020/0114933 A1* | 4/2020 | Ono | G05D 1/0038 |
| 2020/0339138 A1* | 10/2020 | Ko | B60W 30/10 |
| 2021/0180981 A1 | 6/2021 | Matsumoto et al. | |
| 2021/0372810 A1 | 12/2021 | Hato et al. | |
| 2022/0058998 A1* | 2/2022 | Yagyu | G09G 3/002 |
| 2022/0080827 A1* | 3/2022 | Sung | B60W 30/16 |
| 2022/0130296 A1* | 4/2022 | Kamiya | B60K 35/00 |
| 2022/0144087 A1* | 5/2022 | Takemori | G08G 1/16 |
| 2022/0169274 A1* | 6/2022 | Seitz | B60W 60/001 |
| 2022/0198602 A1* | 6/2022 | Shin | G06T 3/0093 |
| 2022/0198990 A1* | 6/2022 | Shin | G09G 3/2092 |
| 2022/0379727 A1* | 12/2022 | Yokoyama | B60W 50/14 |

FOREIGN PATENT DOCUMENTS

| | | |
|---|---|---|
| JP | 2020038362 A | 3/2020 |
| JP | 2020132137 A | 8/2020 |
| JP | 2021049968 A | 4/2021 |

\* cited by examiner

VEHICLE DISPLAY DEVICE, VEHICLE DISPLAY SYSTEM, VEHICLE DISPLAY METHOD, AND NON-TRANSITORY STORAGE MEDIUM STORING A PROGRAM

CROSS-REFERENCE TO RELATED APPLICATION

This application is based on and claims priority under 35 USC 119 from Japanese Patent Application No. 2021-122033 filed on Jul. 26, 2021, the disclosure of which is incorporated by reference herein.

BACKGROUND

Technical Field

The present disclosure relates to a vehicle display device, a vehicle display system, a vehicle display method, and a non-transitory storage medium storing a program.

Related Art

Japanese Patent Application Laid-Open (JP-A) No. 2020-132137 discloses a display control device that controls display using a head-up display (HUD). More specifically, JP-A No. 2020-132137 displays non-superimposed content when turning left or right, and then displays superimposed content in a superimposed manner.

However, in a vehicle equipped with a driving assistance device that performs acceleration and deceleration of the vehicle automatically, during deceleration, an occupant may not be able to recognize the reason for deceleration, thereby causing a feeling of anxiety.

SUMMARY

The present disclosure provides a vehicle display device, a vehicle display system, a vehicle display method, and a non-transitory storage medium storing a program which do not cause a feeling of anxiety to an occupant during deceleration of a vehicle.

A first aspect of the present disclosure is a vehicle display device including: a curve information acquisition section configured to acquire information relating to a degree of curvature of a travel lane; a deceleration determination section configured to determine whether or not deceleration of a vehicle is required based on the degree of curvature of the travel lane and a vehicle speed; and a marking display section configured to, in a case in which deceleration is required, cause a display device to display a predetermined first marking superimposed along the travel lane at a display region inside a vehicle cabin.

In the vehicle display device according to the first aspect, the curve information acquisition section acquires information relating to the degree of curvature of the travel lane. Further, the deceleration determination section determines whether or not deceleration of the vehicle is required based on the degree of curvature of the travel lane and the vehicle speed. Moreover, in a case in which the deceleration determination section determines that deceleration of the vehicle is required, the marking display section causes a first marking to be displayed superimposed along the travel lane. This enables an occupant to be aware of, in advance, deceleration by visually checking the first marking displayed superimposed along the curve. Note that "display superimposed" as used herein is not limited to a configuration in which superimposed display is performed with respect to an obstacle than can be seen through windshield glass, and broadly encompasses a configuration in which superimposed display is performed on an image of the obstacle displayed at a display or the like inside the vehicle cabin.

In a second aspect of the present disclosure, in the first aspect, the marking display section may be configured to cause a plurality of the first markings to be displayed outside the travel lane.

In the vehicle display device according to the second aspect, by displaying plural first markings outside the travel lane, even in a case in which the first markings are displayed ahead of the line of sight of the occupant using a head-up display device or the like, deterioration of visibility of the travel lane can be suppressed.

In a third aspect of the present disclosure, in the first aspect or the second aspect, the marking display section may be configured to cause a second marking to be displayed at a deceleration zone in which deceleration is performed.

The vehicle display device according to the third aspect enables an occupant to accurately be aware of the position at which deceleration is performed.

In a fourth aspect of the present disclosure, in any one of the first aspect to the third aspect, the marking display section may be configured to cause an amount of time, until deceleration is to be performed, to be displayed.

The vehicle display device according to the fourth aspect enables an occupant to accurately be aware of the timing at which deceleration is performed. Note that "causes an amount of time until deceleration is performed to be displayed" as used herein is not limited to a configuration in which the number of seconds until deceleration is performed is displayed as a numerical value, and broadly encompasses a configuration in which animation using a bar-shaped marking or a circular marking, such as a progress bar, is displayed.

A fifth aspect of the present disclosure is a vehicle display system including: the vehicle display device according to any one of claim 1 to claim 4; and a display device configured to display the predetermined first marking superimposed at the display region.

In the vehicle display system according to the fifth aspect, in response to an instruction from the marking display section, the display device displays plural markings superimposed along the travel lane.

A sixth aspect of the present disclosure is a display method including: acquiring information relating to a degree of curvature of a travel lane; determining whether or not deceleration of a vehicle is required based on the degree of curvature of the travel lane and a vehicle speed; and in a case in which deceleration is required, displaying a plurality of predetermined markings superimposed along the travel lane at a display region inside a vehicle cabin.

A non-transitory storage medium storing a program according to a seventh aspect causes a computer to perform processing, the processing including: acquiring information relating to a degree of curvature of a travel lane; determining whether or not deceleration of a vehicle is required based on the degree of curvature of the travel lane and a vehicle speed; and in a case in which deceleration is required, displaying plural predetermined markings superimposed along the travel lane at a display region inside a vehicle cabin.

The vehicle display device, the vehicle display system, the vehicle display method, and the non-transitory storage medium storing a program according to the present disclosure do not cause a feeling of anxiety to an occupant during deceleration of the vehicle.

BRIEF DESCRIPTION OF THE DRAWINGS

An exemplary embodiment of the present disclosure will be described in detail based on the following figures, wherein.

DETAILED DESCRIPTION

Explanation follows regarding a vehicle display system S according to an exemplary embodiment, with reference to the drawings. Note that the arrow UP illustrated in FIG. 1 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

Figure 1:
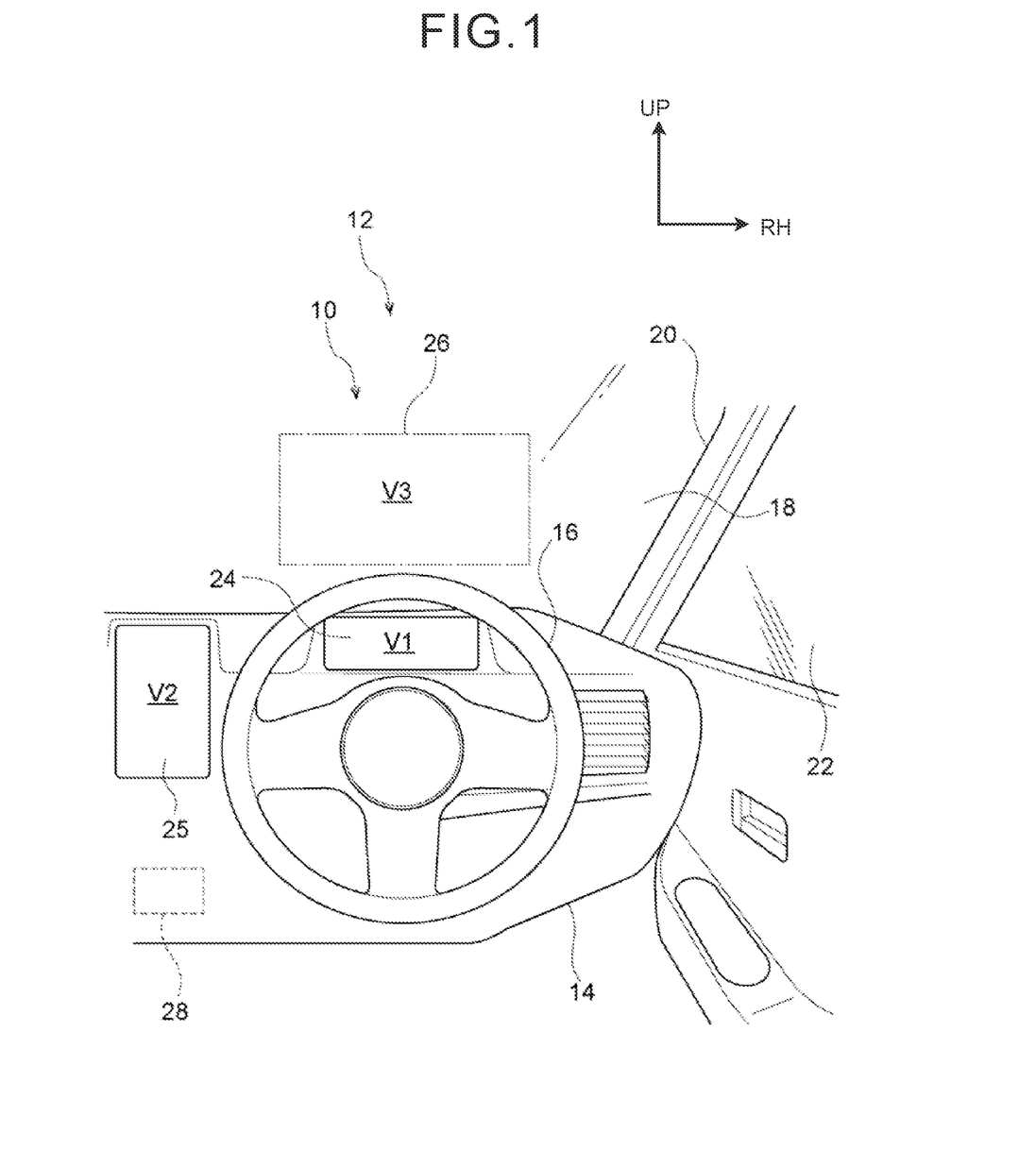
FIG. 1 is a schematic diagram illustrating a front part inside a vehicle cabin, viewed from a vehicle rearward side, of a vehicle to which a vehicle display system according to an exemplary embodiment has been applied.

As illustrated in FIG. 1, an instrument panel 14 is provided at a front part inside a vehicle cabin of a vehicle 12. The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat is installed on the right side of the vehicle.

A windshield glass 18 is provided at a front end part of the instrument panel 14. The windshield glass 18 extends in the vehicle vertical direction and the vehicle width direction to partition the vehicle cabin interior from an exterior of the vehicle cabin.

A vehicle right side end part of the windshield glass 18 is fixed to a front pillar 20 on the vehicle right side. The front pillar 20 extends in the vehicle vertical direction, and the windshield glass 18 is fixed to an inner side end part of the front pillar 20 in the vehicle width direction. Further, a front end part of a front side glass 22 is fixed to an outer side end part of the front pillar 20 in the vehicle width direction. A vehicle left side end part of the windshield glass 18 is fixed to a front pillar (not shown) on the left side of the vehicle.

Here, the instrument panel 14 is provided with a first display section 24 that includes a display region V1 for an image. The first display section 24 is a meter display that is positioned at the vehicle right side of the instrument panel 14, and predetermined information is displayed at the first display section 24 by a first display device 42 (see FIG. 2). The first display section 24 is connected to various meter devices installed in the vehicle 12, and is provided at a position that enters the field of view in a state in which a driver has oriented their line of sight toward the vehicle front.

The instrument panel 14 is provided with a second display section 25 that includes a display region V2 for an image. The second display section 25 is configured by a center display provided at a center part of the instrument panel 14 in the vehicle width direction, and predetermined information is displayed at the second display section 25 by a second display device 44 (see FIG. 2).

The windshield glass 18 is provided with a third display section 26 that has a display region V3 for an image. The third display section 26 is installed at a vehicle upper side of the first display section 24, and is configured by a projection plane projected by a third display device 46 (see FIG. 2). Here, the third display device 46 is a head-up display device provided at a vehicle front side of the instrument panel 14, and is configured such that an image is projected from the third display device 46, which is this head-up display device, onto the third display section 26 of the windshield glass 18. Namely, the third display section 26 is a part of the windshield glass 18 serving as a projection plane of the head-up display device.

Further, in the present exemplary embodiment, as an example, the third display device 46 is a so-called augmented reality head up display (AR-HUD) device configured so as to be capable of displaying an image superimposed on a foreground of the vehicle 12. Namely, the third display device 46 defines an angle of view based on the eye point of the driver and the image plane of the virtual range in a space in which a virtual image can be imaged. Further, the third display device 46 is configured to control the display position so as to continuously maintain the positional relationship between the eye point of the driver, the superimposition target in the foreground, and the superimposition display.

Note that the vehicle 12 is provided with a vehicle display device 10 that configures the vehicle display system S. The vehicle display device 10 of the present exemplary embodiment is, for example, a display electronic control unit (ECU) that performs various display control.

(Hardware Configuration of Vehicle Display System S)

Figure 2:
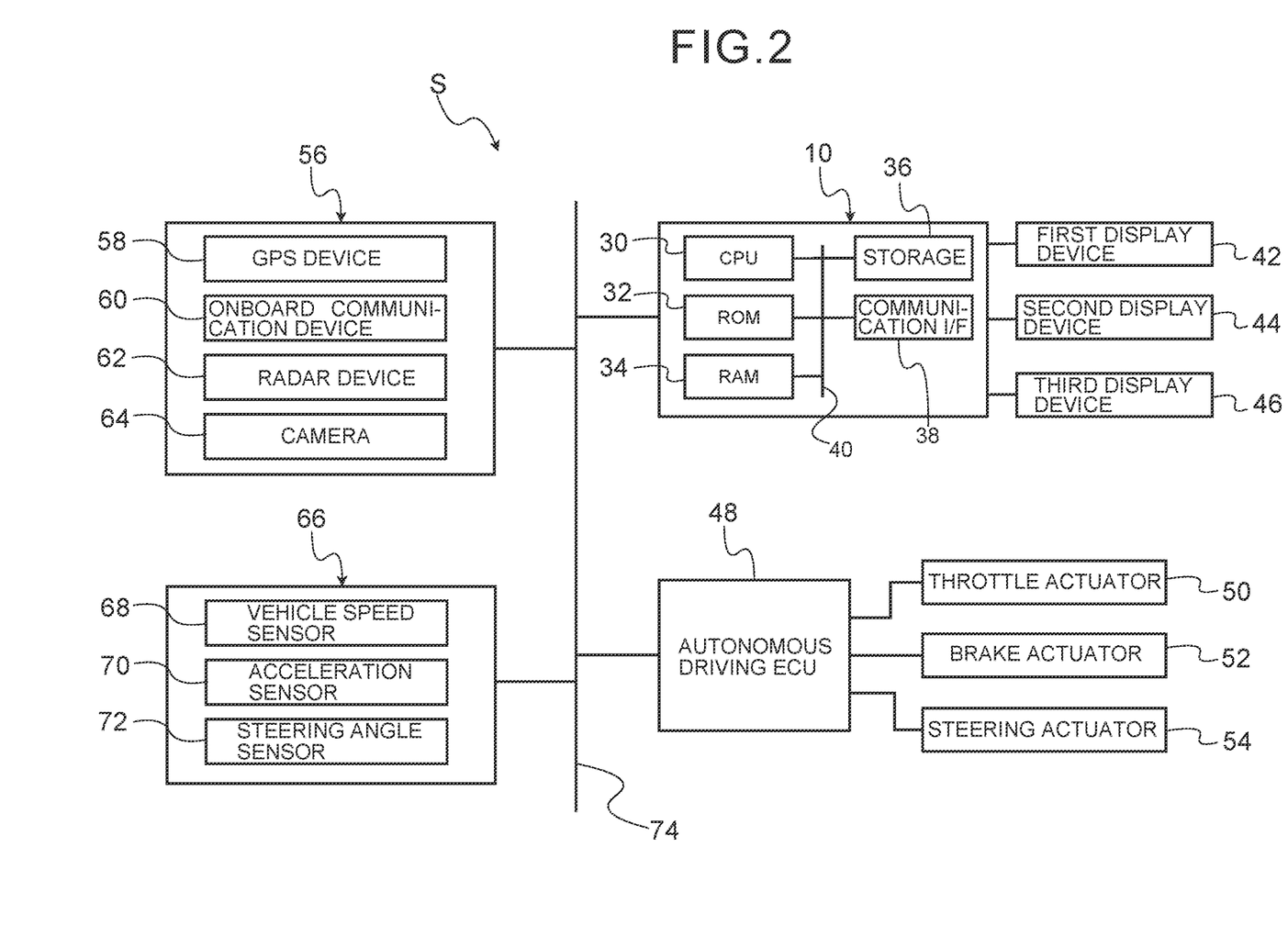
FIG. 2 is a block diagram illustrating a hardware configuration of a vehicle display device according to an exemplary embodiment.

As illustrated in FIG. 2, the vehicle display system S includes the vehicle display device 10, a peripheral information acquisition sensor group 56, a vehicle information acquisition sensor group 66, and an autonomous driving ECU 48, all of which are communicably connected by a communication bus 74.

The vehicle display device 10 includes a central processing unit (CPU: processor) 30, read only memory (ROM) 32, random access memory (RAM) 34, storage 36, and a communication interface (communication I/F) 38. These respective configurations are communicably connected to each other via an internal bus 40.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace that temporarily stores programs and data. The storage 36 is configured by a hard disk drive (HDD) or a solid state drive (SSD), and is a non-transitory storage medium that stores various programs including an operating system, as well as various data. In the present exemplary embodiment, a display program for performing display processing and the like are stored in the ROM 32 or the storage 36.

The communication I/F 38 is an interface for the vehicle display device 10 to communicate with an external server and other devices and, for example, a protocol such as a controller area network (CAN), Ethernet (registered trademark), long term evolution (LTE), a fiber distributed data interface (FDDI), or Wi-Fi (registered trademark) is used.

The first display device 42, the second display device 44, and the third display device 46 are connected to the vehicle display device 10. The first display device 42 displays an image at the display region V1 of the first display section 24. The second display device 44 displays an image at the display region V2 of the second display section 25. The third display device 46 displays an image at the display region V3 of the third display section 26.

The peripheral information acquisition sensor group 56 includes a global positioning system (GPS) device 58, an onboard communication device 60, a radar device 62, and a camera 64.

The GPS device 58 receives GPS signals from plural GPS satellites to measure the position of the host vehicle. The onboard communication device 60 is a communication device that enables inter-vehicle communication with other vehicles, roadside-to-vehicle communication with roadside devices, and the like.

The radar device 62 is a sensor for detecting an object, such as a pedestrian or another vehicle, present in the periphery of the vehicle, and includes plural radar devices with different detection ranges from each other. For example, the radar device 62 may include a LIDAR (Light Detection and Ranging) sensor or the like. Further, the radar device 62 may acquire the relative position and the relative speed of the detected object and the host vehicle.

The camera 64 captures an image of the periphery of the vehicle, and outputs the captured image. For example, the camera 64 includes a forward facing camera that captures images of ahead of the vehicle, a rearward facing camera that captures images behind the vehicle, a side camera that captures images both to the left and to the right of the vehicle, and the like.

The vehicle information acquisition sensor group 66 includes a vehicle speed sensor 68, an acceleration sensor 70, and a steering angle sensor 72. The vehicle speed sensor 68 directly or indirectly detects and outputs a speed of the vehicle. The acceleration sensor 70 directly or indirectly detects and outputs an acceleration of the vehicle. The steering angle sensor 72 directly or indirectly detects and outputs a steering angle of the vehicle.

The autonomous driving ECU 48 is a control section for performing autonomous driving processing to cause a vehicle to travel automatically without driving operation by an occupant, and the autonomous driving ECU 48 is electrically connected to a throttle actuator 50, a brake actuator 52, and a steering actuator 54.

The throttle actuator 50 is an actuator that changes a throttle position of the vehicle, and the brake actuator 52 is an actuator that changes a braking force generated by a braking device of the vehicle. Further, the steering actuator 54 is an actuator that changes a steering amount by a steering device of the vehicle.

Here, in the autonomous driving processing performed by the autonomous driving ECU 48, the conditions of the vehicle and its periphery are determined based on information acquired from the peripheral information acquisition sensor group 56 and the vehicle information acquisition sensor group 66, and the throttle actuator 50, the brake actuator 52, and the steering actuator 54 are controlled according to the peripheral conditions.

The present exemplary embodiment is configured so as to be able to switch between an autonomous driving mode and a manual driving mode, and in the autonomous driving mode, as described above, the host vehicle is caused to travel automatically without driving operation by an occupant of the vehicle. On the other hand, in the manual driving mode, an occupant performs at least some of the driving operations. For example, the manual driving mode includes a case in which an occupant performs all driving operations, as well as a case in which the occupant performs steering operations and the autonomous driving ECU 48 effects acceleration and deceleration of the vehicle, such as in a cruise control function.

(Functional Configuration of Vehicle Display Device 10)

The vehicle display device 10 implements various functions using the above-described hardware resources. Explanation follows regarding functional configurations implemented by the vehicle display device 10, with reference to FIG. 3.

Figure 3:
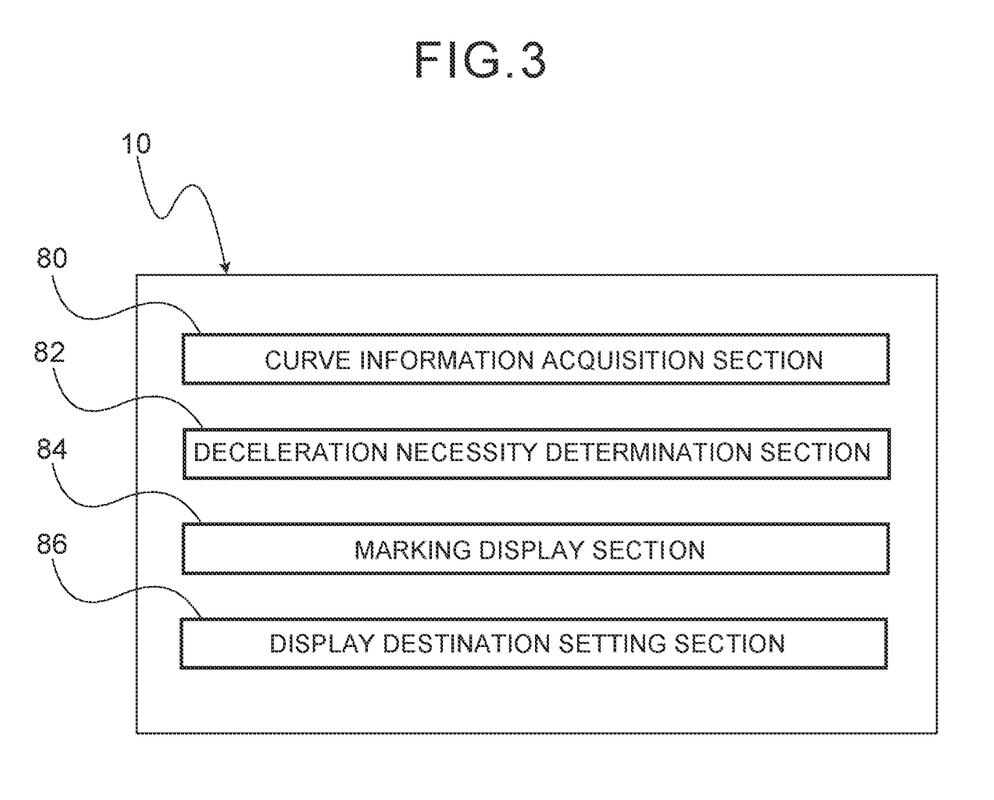
FIG. 3 is a block diagram illustrating a functional configuration of a vehicle display device according to an exemplary embodiment.

As illustrated in FIG. 3, the functional configuration of the vehicle display device 10 includes a curve information acquisition section 80, a deceleration determination section 82, a marking display section 84, and a display destination setting section 86. The respective functional configurations are implemented by the CPU 30 reading and executing programs stored in the ROM 32 or the storage 36.

The curve information acquisition section 80 acquires information relating to the degree of curvature of the travel lane in which the vehicle 12 is traveling. In the present exemplary embodiment, as an example, the curve information acquisition section 80 calculates a radius of curvature of a curve of a travel lane from image data of ahead of the vehicle which is captured by the camera 64. Further, the curve information acquisition section 80 may acquire data relating to a curve through which the vehicle 12 is scheduled to travel, based on the GPS device 58 and map information recorded in a navigation system.

The deceleration determination section 82 determines whether or not deceleration of the vehicle 12 is required, based on the degree of curvature of the travel lane and the vehicle speed. More specifically, the deceleration determination section 82 determines whether or not deceleration of the vehicle 12 is required, based on the information relating to the degree of curvature of the travel lane which is acquired by the curve information acquisition section 80 and the speed of the vehicle 12 which is acquired from the vehicle speed sensor 68. At this time, in the present exemplary embodiment, as an example, the deceleration determination section 82 performs a determination when the vehicle 12 has reached a determination position that is a predetermined distance before the position at which the vehicle 12 enters the curve.

For example, data in which the maximum speed at the time of entering a curve, corresponding to the radius of curvature of the curve, is set is stored, and the deceleration determination section 82 may determine that deceleration is required in a case in which the current speed of the vehicle 12 is faster than the maximum speed corresponding to the radius of curvature of the curve with reference to this data.

In a case in which deceleration of the vehicle 12 is required, the marking display section 84 causes at least one of the first display device 42, the second display device 44 or the third display device 46 to display a predetermined marking at at least one of the display region V1, the display region V2 or the display region V3 within the vehicle cabin, superimposed along the travel lane.

In the present exemplary embodiment, as an example, in a case in which a marking is displayed at the display region V1 by the first display device 42 or in a case in which a marking is displayed at the display region V2 by the second display device 44, the marking is displayed superimposed on the travel lane in the image of ahead of the vehicle which is captured by the camera 64. Further, in a case in which a marking is displayed at the display region V3 by the third display device 46, the marking is displayed superimposed at a position of the travel lane, as viewed by the occupant, in the foreground of the vehicle. A specific example of display of markings at the display region V3 is described below.

The display destination setting section 86 sets a display destination of a marking. More specifically, the display destination setting section 86 determines at which of the display region V1, the display region V2 or the display region V3 to display the marking. For example, in a case in which an occupant is looking ahead of the vehicle, the display destination setting section 86 causes markings to be displayed at the display region V3. On the other hand, in a case in which an occupant is looking at the information displayed at the display region V2 during travel in the autonomous driving mode, the display destination setting section 86 may cause a marking to be displayed at the display region V2 together with a foreground image.

Display Example

Figure 4:
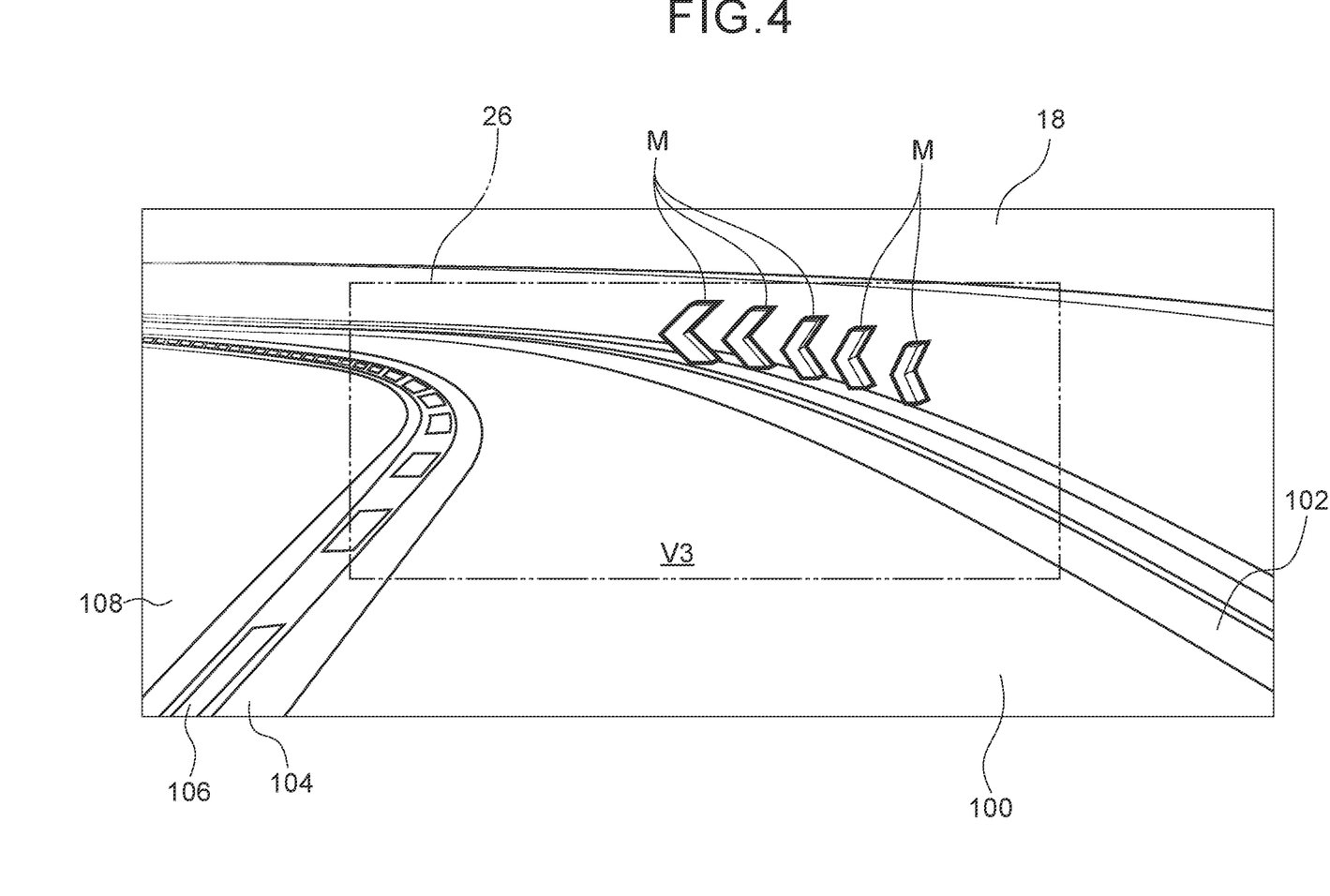
FIG. 4 is a diagram illustrating a display example of a display region in an exemplary embodiment.

Next, explanation is provided regarding a display example that is displayed at the display region V3 of the third display section 26, with reference to FIG. 4.

As illustrated in FIG. 4, a view ahead of the vehicle is visible through the windshield glass 18 at the display region V3. Note that, for simplicity of explanation, only a partial view of the windshield glass 18 is illustrated in the drawings.

Here, in FIG. 4, the vehicle 12 is traveling in a travel lane 100 before a curve, and a white line 102 extends along the travel lane 100 at the right edge of the travel lane 100. Further, a white line 104 extends along the travel lane 100 at the left edge of the travel lane 100. In addition, a lane boundary line 106 extends to the left of the white line 104, and a lane 108 extends to the left of the lane boundary line 106. Namely, in FIG. 4, as an example, the road is a road with two lanes on each side, and the vehicle 12 is traveling in the right lane.

Here, five markings M are displayed at the display region V3 by the marking display section 84. In the present exemplary embodiment, as an example, five markings M are displayed with spaces therebetween outside the travel lane 100. More specifically, the five markings M are displayed so as to appear above the white line 102 to the right of the travel lane 100.

Further, the five markings M are displayed in a three-dimensional, approximately arrow feather shape, and are displayed such that the angles of the arrow feathers along a curve of the travel lane 100 differ. By the markings M being displayed along a curve by the marking display section 84 in this manner, the occupant is notified of deceleration in preparation for the curve.

(Operation)

Next, explanation is provided regarding the operation of the present exemplary embodiment.

(Display Processing)

Figure 5:
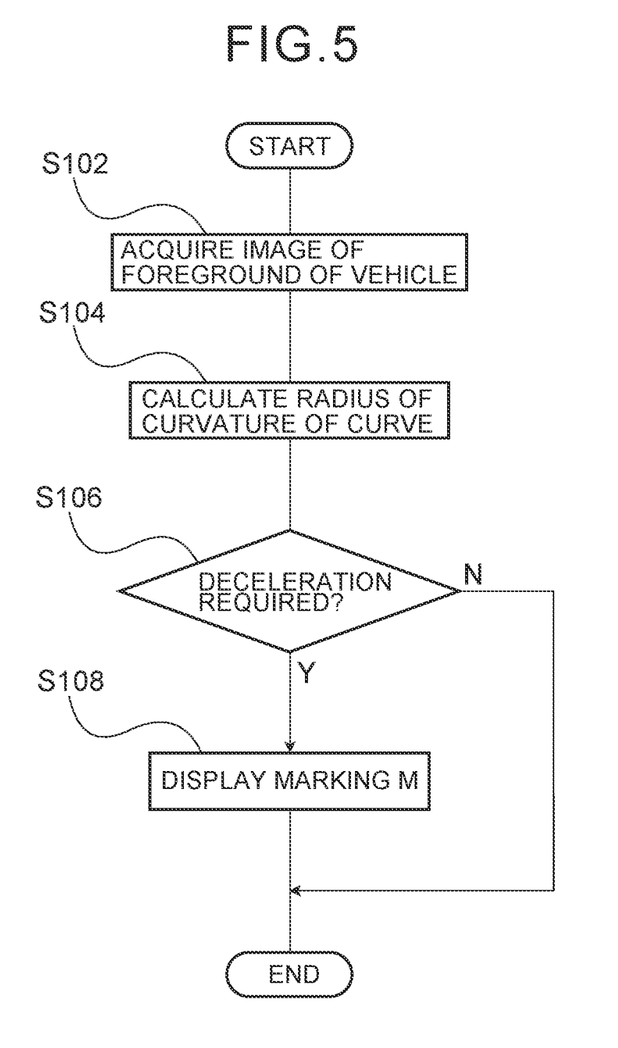
FIG. 5 is a flowchart illustrating an example of a flow of display processing in an exemplary embodiment.

Explanation follows regarding an example of display processing to cause display of the markings M at the display region V3 of the third display section 26, with reference to the flowchart illustrated in FIG. 5. This display processing is executed by the CPU 30 reading a display program from the ROM 32 or the storage 36, and loading and executing the display program in the RAM 34.

At step S102, the CPU 30 acquires an image of the foreground of the vehicle 12. More specifically, the CPU 30 acquires an image of ahead of the vehicle 12 which is captured by the camera 64 using the functionality of the curve information acquisition section 80.

At step S104, the CPU 30 calculates the radius of curvature of a curve. More specifically, the CPU 30 extracts the travel lane 100 from the acquired image, and calculates the radius of curvature of the travel lane 100 by image processing.

Next, at step S106, the CPU 30 determines whether or not deceleration is required. More specifically, in a case in which the speed of the vehicle 12 is faster than the maximum possible travel speed corresponding to the radius of curvature of the curve, based on the functionality of the deceleration determination section 82, the CPU 30 makes an affirmative determination at step S106, and the processing transitions to step S108. On the other hand, in a case in which the speed of the vehicle 12 is slower than the maximum possible travel speed corresponding to the radius of curvature of the curve, deceleration is not required, and therefore a negative determination is made at step S106, and the display processing is ended. Namely, in a case in which deceleration of the vehicle 12 is not required, the markings M are not displayed.

At step S108, the CPU 30 displays the five markings M along the travel lane 100 using the functionality of the marking display section 84 (see FIG. 4). Then, the CPU 30 ends the display processing.

After the markings M have been displayed by the marking display section 84, the autonomous driving ECU 48 controls the brake actuator 52 so as to automatically decelerate the vehicle 12 without operation by the driver.

As described above, in the vehicle display system S and the vehicle display device 10 according to the present exemplary embodiment, an occupant can be aware of deceleration in advance by visually recognizing the markings M displayed in a superimposed manner along a curve.

Further, in the present exemplary embodiment, the plural (five) markings M are displayed outside the travel lane 100, enabling deterioration in the visibility of the travel lane 100 to be suppressed even if the markings M are displayed ahead of the line of sight of an occupant.

Although in the above exemplary embodiment, as illustrated in FIG. 4, the markings M are displayed superimposed on an upper portion of the white line 102 on the right side at the display region V3, there is no limitation thereto. For example, the configuration of the first modified example illustrated in FIG. 6 may be adopted. Further, the configuration of the second modified example illustrated in FIG. 7 may be adopted. In addition, the configuration of the third modified example illustrated in FIG. 8 may be adopted.

First Modified Example

Figure 6:
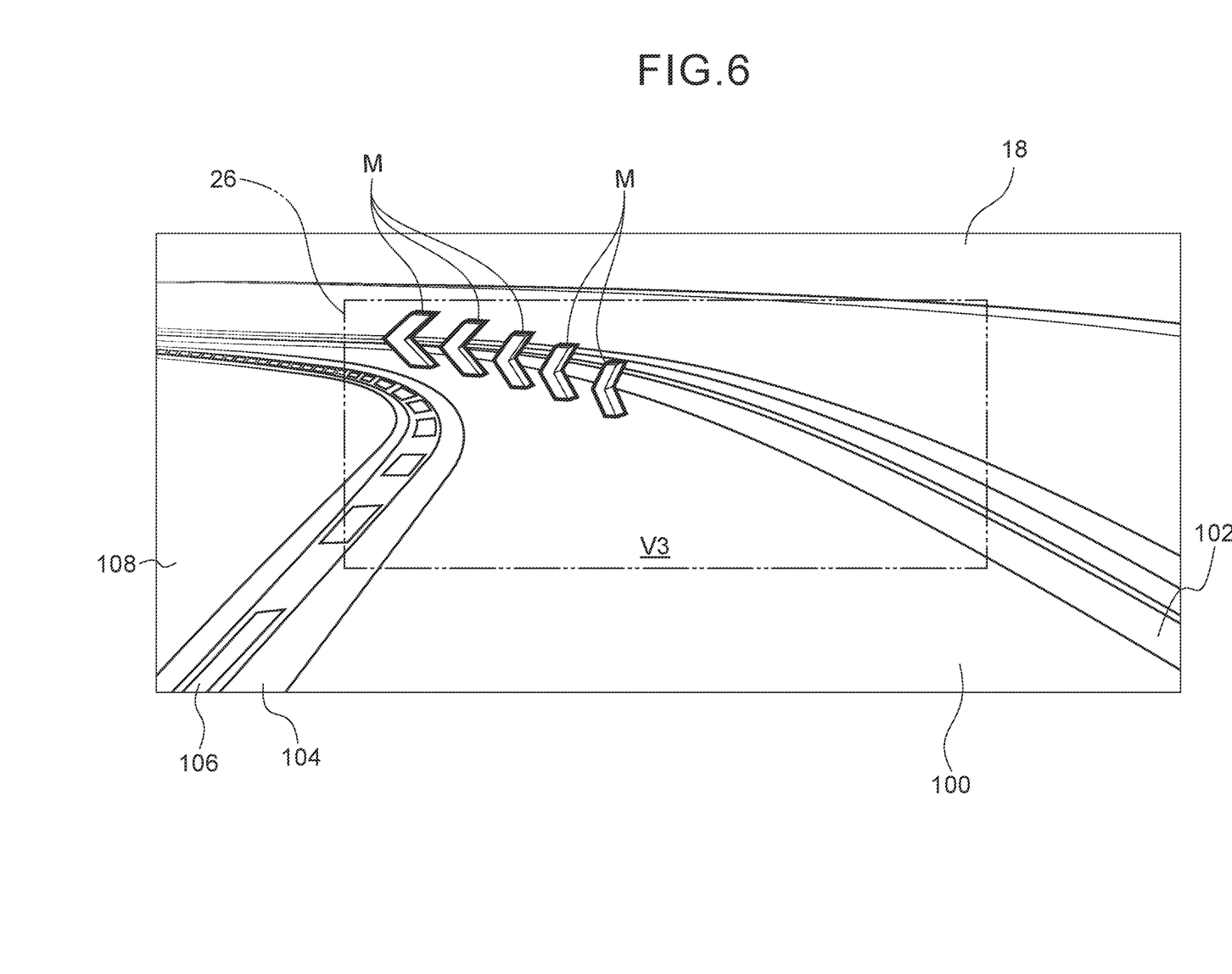
FIG. 6 is a diagram illustrating a display example of a display region in a first modified example.

As illustrated in FIG. 6, in the present modified example, the five markings M are displayed by the marking display section 84 so as to appear above the travel lane 100.

More specifically, the five markings M are displayed in an approximately arrow feather shape with spaces therebetween on the travel lane 100, and are displayed such that the angles of the arrow feathers along a curve of the travel lane 100 differ.

Moreover, in the present modified example, the five markings M are displayed with animation in order from the nearest marking M. Here, the speed at which the markings M are displayed is gradually reduced, thereby enabling the occupant to be aware that the vehicle 12 is in a deceleration zone.

As described above, the present modified example enables the occupant to be intuitively aware of deceleration.

Second Modified Example

Figure 7:
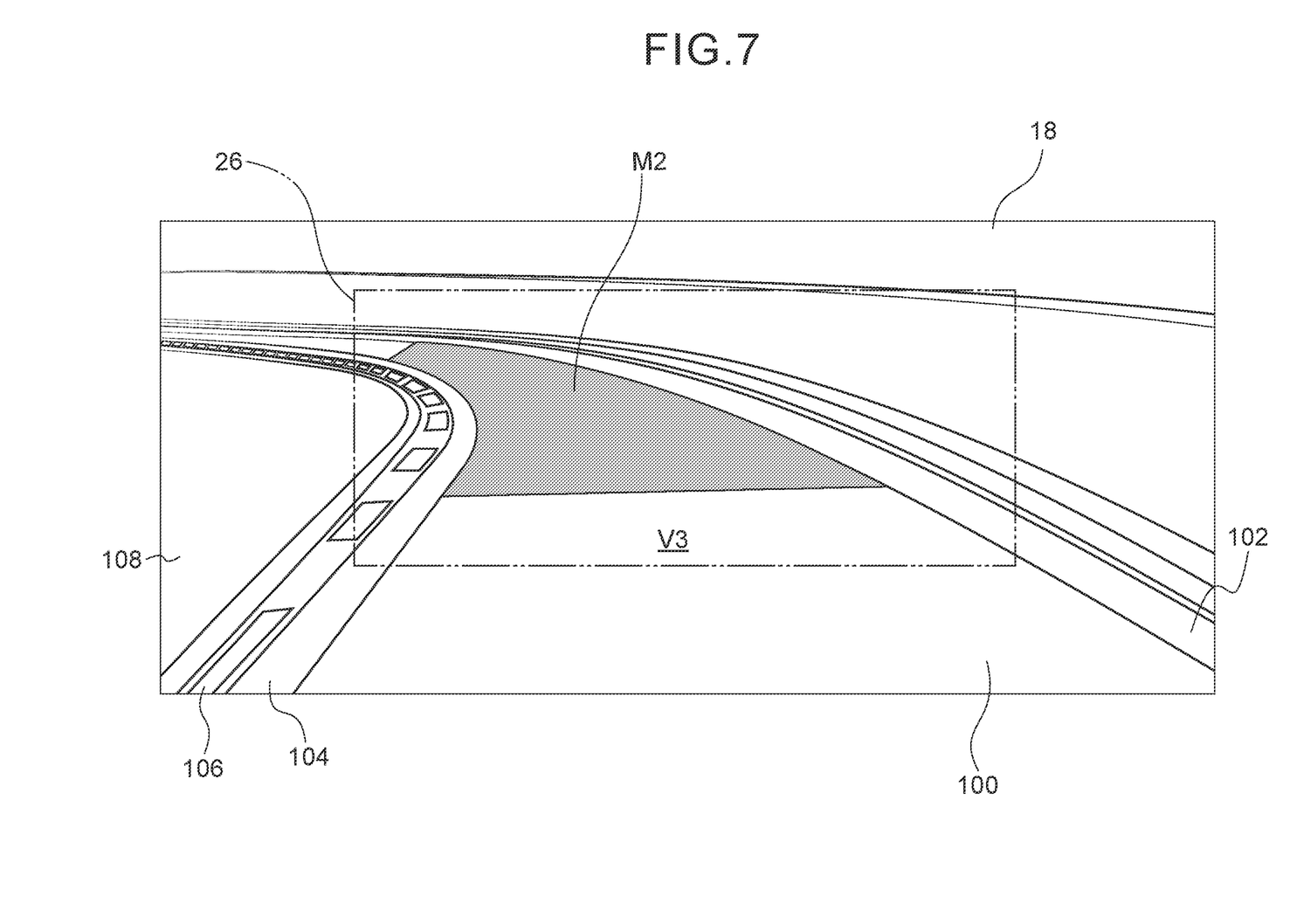
FIG. 7 is a diagram illustrating a display example of a display region in a second modified example.

As illustrated in FIG. 7, in the present modified example, the marking M2 is displayed superimposed on the travel lane 100 by the marking display section 84.

The marking M2 is displayed superimposed on a deceleration zone at which deceleration of the vehicle 12 is performed in the travel lane 100, and is displayed on the entire surface of the travel lane in the deceleration zone.

In this manner, in the present modified example, the marking M2 is displayed superimposed on the deceleration zone, enabling an occupant to accurately be aware of the position at which deceleration is performed. Although not illustrated in FIG. 7, the marking display section 84 may display the amount of time until deceleration is performed at the display region V3. In this case, the occupant can accurately be aware of the timing at which deceleration is performed.

Various display modes may be adopted as a display mode of the amount of time until deceleration is performed. For example, the marking display section 84 may display the number of seconds until deceleration is performed at the display region V3. Alternatively, the marking display section 84 may display a bar-shaped marking, such as a progress bar, and gradually change the color from one end side to the other end side of the bar-shaped marking so as to enable an occupant to be aware of the amount of time until deceleration is performed.

Third Modified Example

Figure 8:
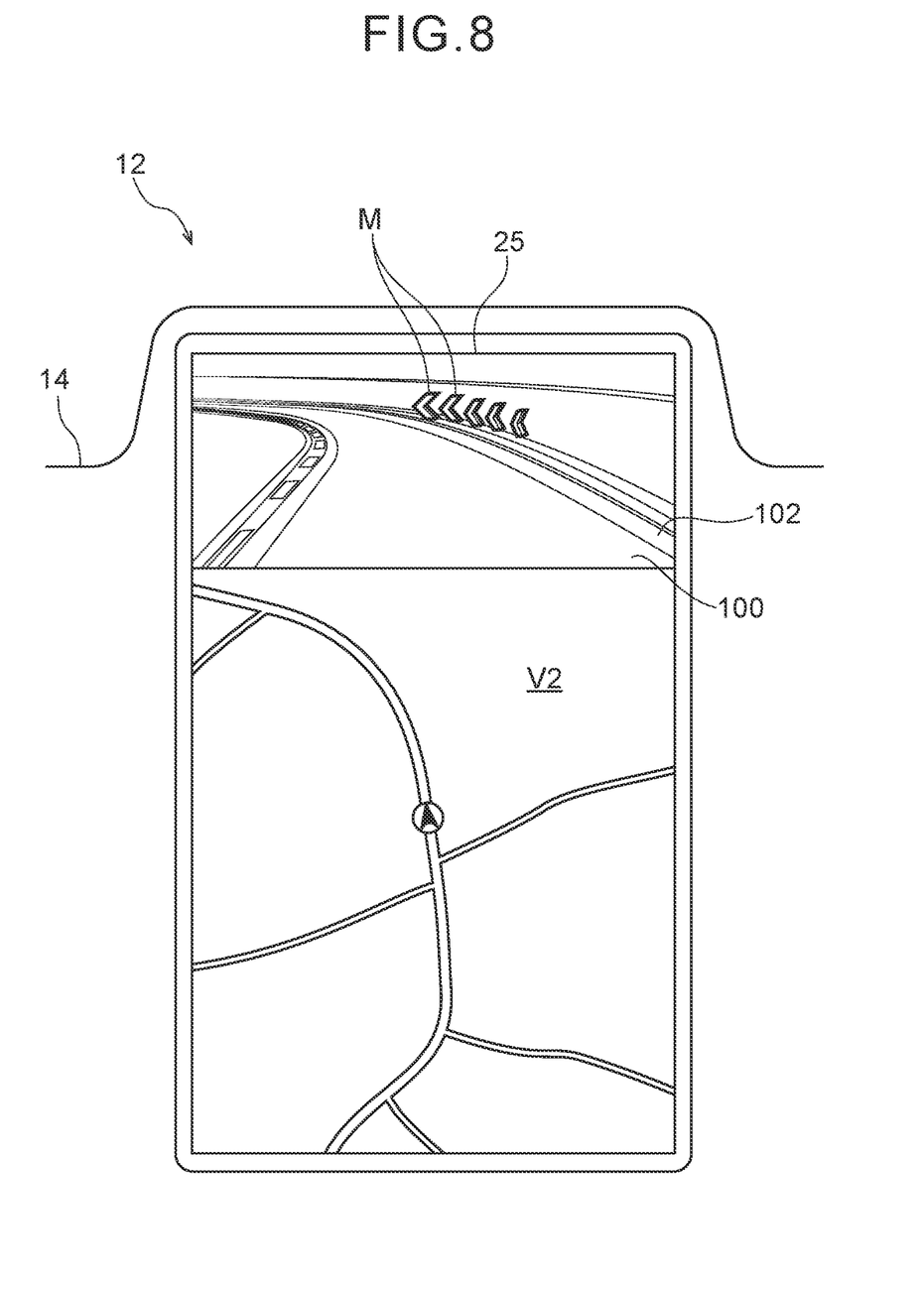
FIG. 8 is a diagram illustrating a display example of a display region in a third modified example.

As illustrated in FIG. 8, in the present modified example, the display region V2 of the second display section 25 is divided vertically. Further, a screen of the navigation system is displayed at the lower part of the display region V2. On the screen of the navigation system, for example, the current position of the vehicle 12 and the road around the vehicle are displayed.

An image of ahead of the vehicle is displayed at the upper part of the display region V2. More specifically, an image that is captured by the camera 64 is displayed at the display region V2. Further, five markings M are displayed at the display region V2. More specifically, in a similar manner to the above exemplary embodiment, the markings M are displayed by the marking display section 84 so as to appear above the right white line 102.

In this manner, in the present modified example, the markings M are displayed at the second display section 25 provided at the instrument panel 14. This enables the inconvenience caused by the markings M to be reduced in a state in which a driver has oriented their line of sight forward, in comparison to a configuration in which the markings M are displayed superimposed on an actual obstacle.

Although explanation has been given regarding the vehicle display system S and the vehicle display device 10 according to the exemplary embodiments, obviously various embodiments may be implemented within a range not departing from the gist of the present disclosure. For example, although the configuration in which the markings M are displayed at the third display section 26 has been described in the above exemplary embodiments, and the configuration in which the markings M are displayed at the second display section 25 has been described in the third modified example, there is no limitation thereto, and the markings M may be displayed at the first display section 24.

Further, although in the above exemplary embodiments, as illustrated in FIG. 4, the markings M are displayed in an approximately arrow feather shape, there is no limitation thereto. For example, a marking in the shape of an arrow may be displayed.

In addition, although the markings M are displayed before autonomous deceleration is performed by the autonomous driving ECU 48 in the exemplary embodiments described above, there is no limitation thereto. For example, even in a case in which an occupant is performing a driving operation, in a case in which the occupant determines that deceleration is required prior to entering a curve, the markings M may be displayed by the marking display section 84.

What is claimed is:

1. A vehicle display device, comprising:
a processor, wherein the processor is configured to:
acquire information relating to a degree of curvature of a travel lane;
determine whether or not deceleration of a vehicle is required based on the degree of curvature of the travel lane and a vehicle speed; and
in a case in which deceleration is required, cause a display device to display a predetermined first marking superimposed along the travel lane at a display region inside a vehicle cabin;
wherein the processor is configured to cause a plurality of the first markings to be displayed outside the travel lane; and
wherein, among the plurality of first markings, a more distant first marking is displayed so as to be larger than a nearer first marking.

2. The vehicle display device according to claim 1, wherein the processor is configured to cause a second marking to be displayed at a deceleration zone in which deceleration is performed.

3. The vehicle display device according to claim 1, wherein the processor is configured to cause an amount of time, until deceleration is to be performed, to be displayed.

4. The vehicle display device of claim 1, where a display area of the more distant first marking on a display screen of the display device is larger than a display area of the nearer first marking on the display screen.

5. The vehicle display device of claim 1, wherein the plurality of the first markings are displayed in order from a nearest first marking to a most distant first marking to thereby provide animation.

6. The vehicle display device of claim 5, wherein the plurality of the first markings are displayed with animation such that a display speed of a more distant first marking is slower than a display speed of a nearer first marking.

7. A vehicle display method, comprising, by a processor:
acquiring information relating to a degree of curvature of a travel lane;
determining whether or not deceleration of a vehicle is required based on the degree of curvature of the travel lane and a vehicle speed; and
in a case in which deceleration is required, displaying a plurality of predetermined markings superimposed along the travel lane at a display region inside a vehicle cabin;
wherein the plurality of the predetermined markings are displayed outside the travel lane; and
wherein, among the plurality of predetermined markings, a more distant predetermined marking is displayed so as to be larger than a nearer predetermined marking.

8. A non-transitory storage medium storing a program that is executable by a computer to perform processing, the processing comprising:
acquiring information relating to a degree of curvature of a travel lane;
determining whether or not deceleration of a vehicle is required based on the degree of curvature of the travel lane and a vehicle speed; and
in a case in which deceleration is required, displaying a plurality of predetermined markings superimposed along the travel lane at a display region inside a vehicle cabin;
wherein the plurality of the predetermined markings are displayed outside the travel lane; and
wherein, among the plurality of predetermined markings, a more distant predetermined marking is displayed so as to be larger than a nearer predetermined marking.

* * * * *